(12) United States Patent
Lee et al.

(10) Patent No.: US 10,912,145 B2
(45) Date of Patent: Feb. 2, 2021

(54) METHOD FOR PERFORMING TRANSMISSION OF A SR BUNDLE IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/084,471

(22) PCT Filed: Feb. 24, 2017

(86) PCT No.: PCT/KR2017/002066
§ 371 (c)(1),
(2) Date: Sep. 12, 2018

(87) PCT Pub. No.: WO2017/179814
PCT Pub. Date: Oct. 19, 2017

(65) Prior Publication Data
US 2019/0082493 A1    Mar. 14, 2019

Related U.S. Application Data

(60) Provisional application No. 62/322,875, filed on Apr. 15, 2016.

(51) Int. Cl.
*H04W 76/36* (2018.01)
*H04W 72/12* (2009.01)
*H04L 1/08* (2006.01)
*H04L 1/00* (2006.01)
(Continued)

(52) U.S. Cl.
CPC ............... *H04W 76/36* (2018.02); *H04L 1/00* (2013.01); *H04L 1/0023* (2013.01); *H04L 1/08* (2013.01); *H04L 1/1874* (2013.01); *H04L 47/266* (2013.01); *H04W 72/1284* (2013.01)

(58) Field of Classification Search
CPC ............. H04W 76/36; H04W 72/1284; H04L 1/0023; H04L 47/266; H04L 1/00; H04L 1/08; H04L 1/1874
See application file for complete search history.

(56) References Cited

U.S. PATENT DOCUMENTS

| 2010/0074231 A1 | 3/2010 | Hsu |
| 2013/0083713 A1 | 4/2013 | Johansson et al. |
| 2013/0115990 A1 | 5/2013 | Koc et al. |

(Continued)

*Primary Examiner* — Walter J Divito
(74) *Attorney, Agent, or Firm* — Birch, Stewart, Kolasch & Birch, LLP

(57) ABSTRACT

The present invention relates to a wireless communication system. More specifically, the present invention relates to a method and a device for performing transmission of a SR bundle in a wireless communication system, the method comprising: configuring that the UE transmits a SR bundle, wherein the SR bundle includes repeated transmissions of a SR, starting to transmit the SR bundle to a BS when the SR is triggered, and stopping the transmission of the SR bundle immediately even if at least part of the repeated transmissions of the SR has not yet been transmitted, when SR cancellation condition is met.

2 Claims, 9 Drawing Sheets

(51) Int. Cl.
*H04L 1/18* (2006.01)
*H04L 12/825* (2013.01)

(56) References Cited

U.S. PATENT DOCUMENTS

| | | | |
|---|---|---|---|
| 2014/0036885 A1 | 2/2014 | Moberg et al. | |
| 2014/0050185 A1 | 2/2014 | Hooli et al. | |
| 2017/0245245 A1* | 8/2017 | Kim | H04W 72/1284 |
| 2018/0317123 A1* | 11/2018 | Chen | H04W 28/0278 |
| 2018/0359766 A1* | 12/2018 | Shih | H04W 72/1284 |

* cited by examiner (a) Control-Plane Protocol Stack

--Prior Art--

(b) User-Plane Protocol Stack

[Fig. 6]
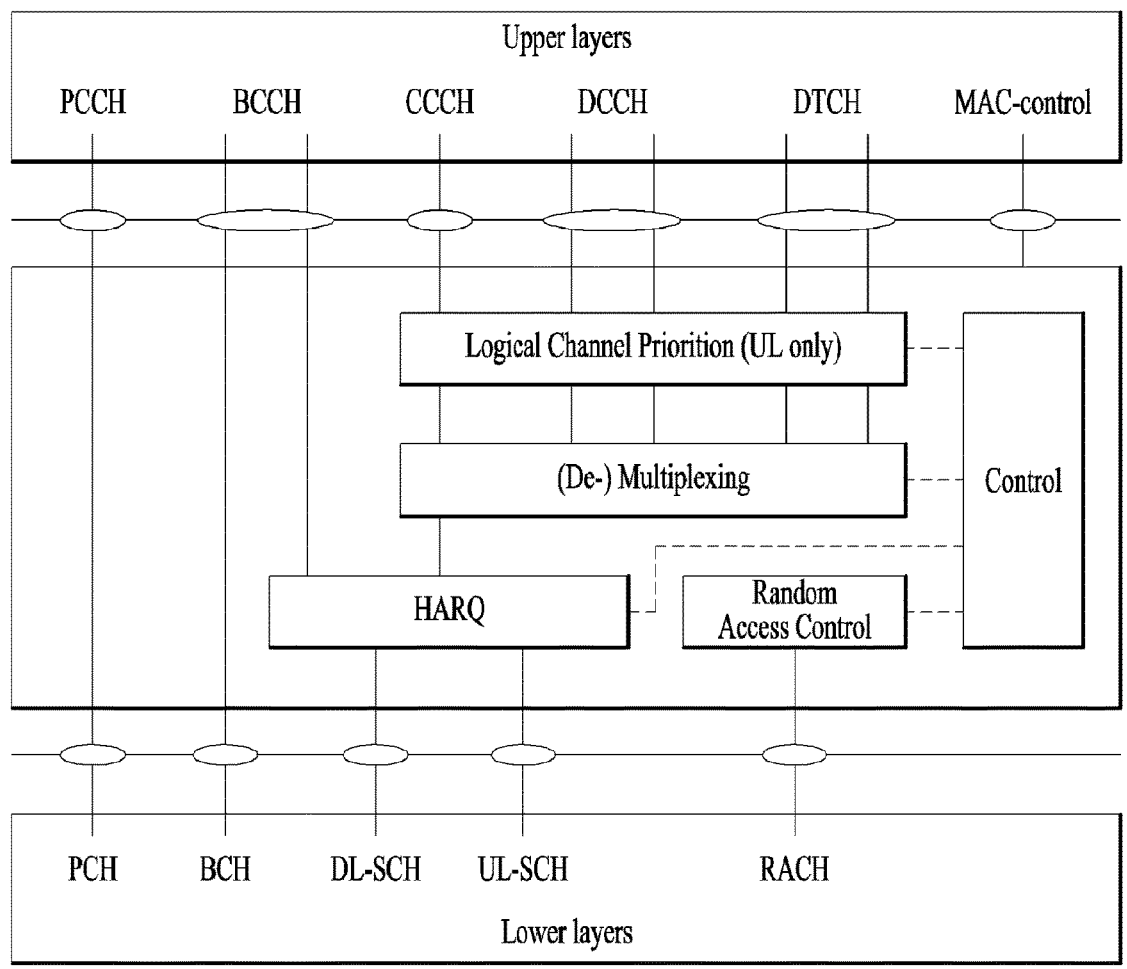

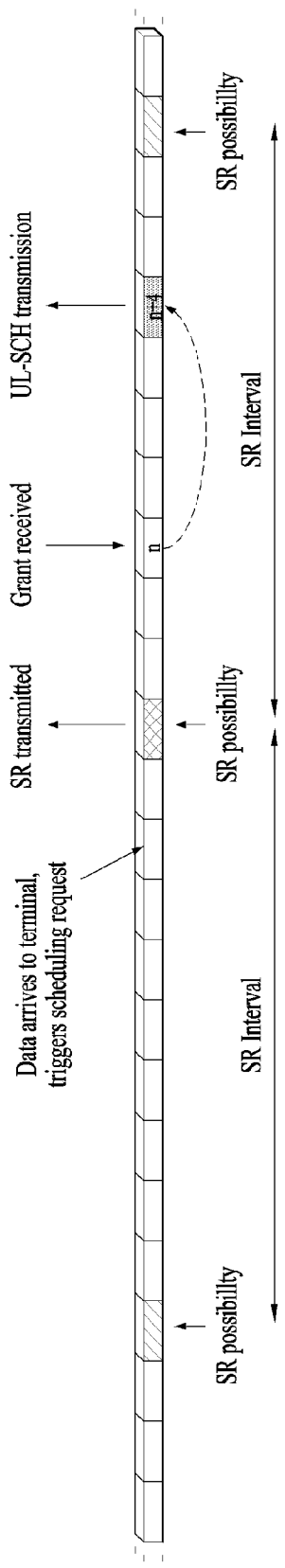
[Fig. 7]

[Fig. 8]
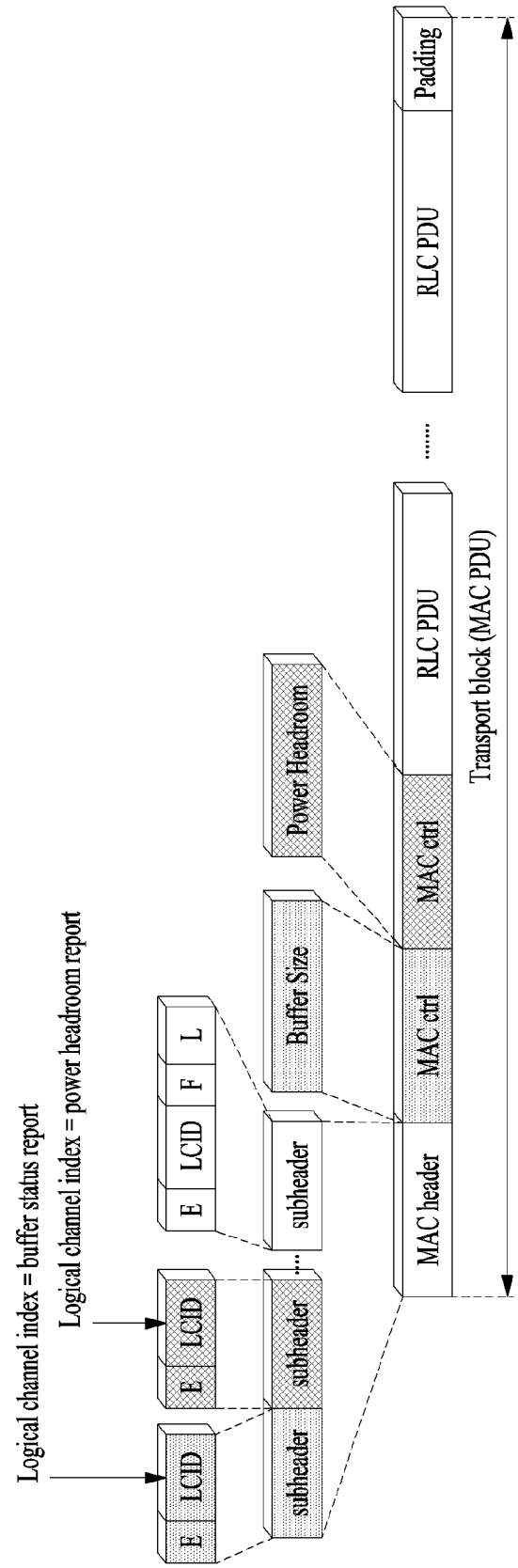

[Fig. 9]
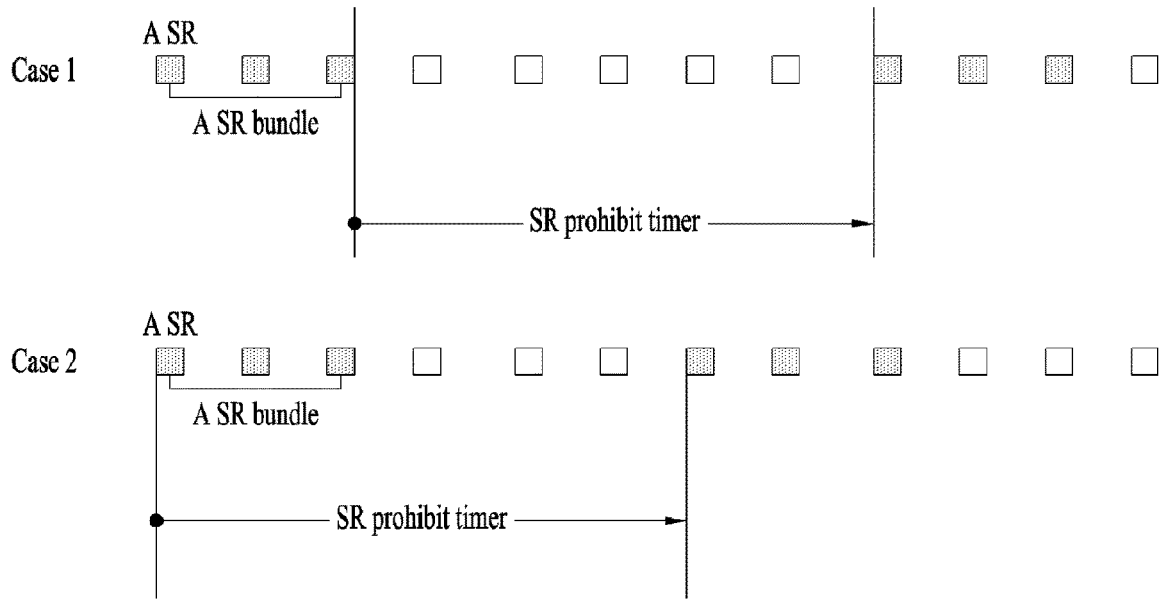
[Fig. 10]
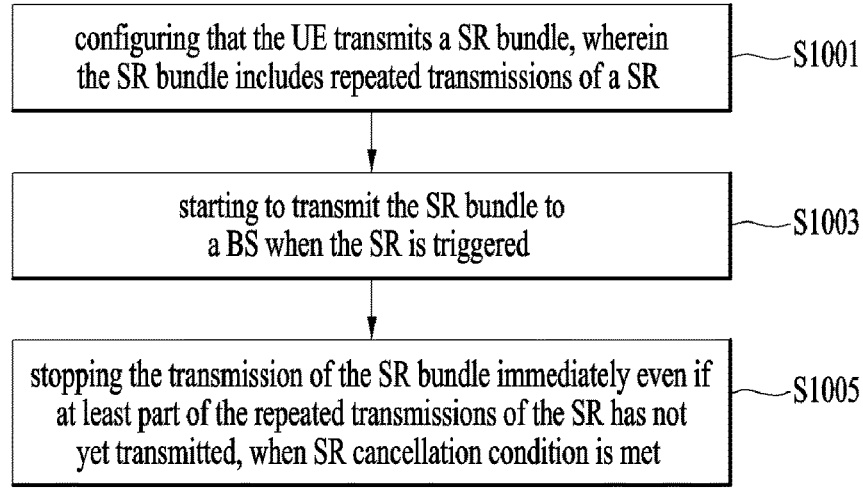
[Fig. 11]
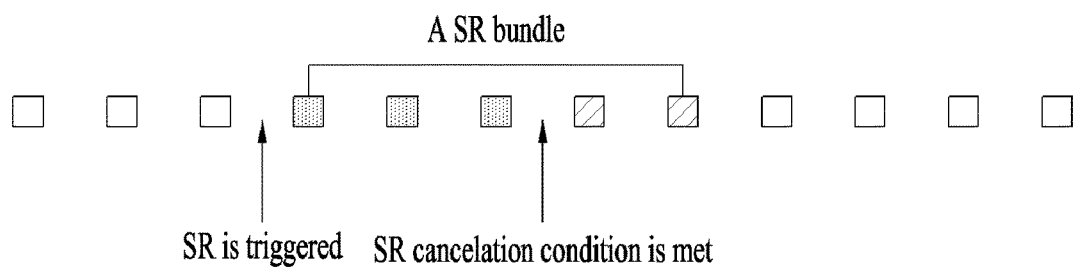

METHOD FOR PERFORMING TRANSMISSION OF A SR BUNDLE IN A WIRELESS COMMUNICATION SYSTEM AND A DEVICE THEREFOR

CROSS REFERENCE TO RELATED APPLICATIONS

This application is the National Phase of PCT International Application No. PCT/KR2017/002066, filed on Feb. 24, 2017, which claims priority under 35 U.S.C. 119(e) to U.S. Provisional Application No. 62/322,875, filed on Apr. 15, 2016, all of which are hereby expressly incorporated by reference into the present application.

TECHNICAL FIELD

The present invention relates to a wireless communication system and, more particularly, to a method for performing transmission of a SR bundle in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for performing transmission of a SR bundle in a wireless communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

To avoid performing unnecessary SR transmission, it is invented that a UE stops transmission of a SR bundle immediately when SR cancellation condition is met while the SR bundle is being transmitted.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a diagram for MAC structure overview in a UE side;

FIG. 7 is a diagram for transmitting a Scheduling Request;

FIG. 8 is a diagram for signaling of buffer status;

FIG. 9 shows two exemplary cases according to the starting points of SR-prohibit timer in case of SR bundle transmission;

FIG. 10 is a conceptual diagram for performing transmission of a SR bundle in a wireless communication system according to embodiments of the present invention; and FIG. 11 shows an example of transmission of a SR bundle according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
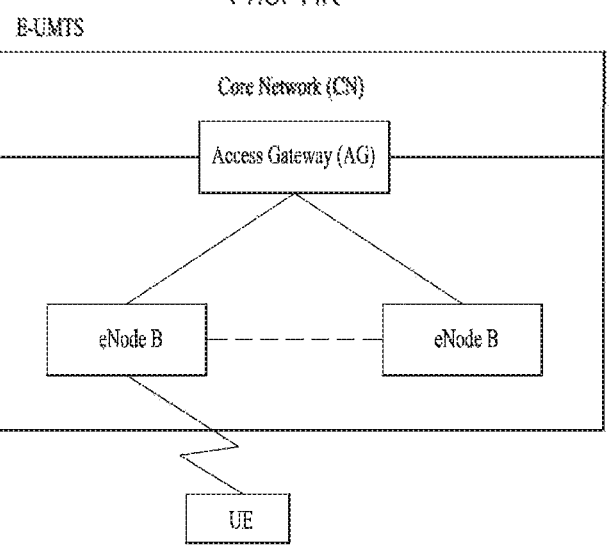
FIG. 1 is a diagram showing a network structure of an Evolved Universal Mobile Telecommunications System (E-UMTS) as an example of a wireless communication system.
Figure 2A:
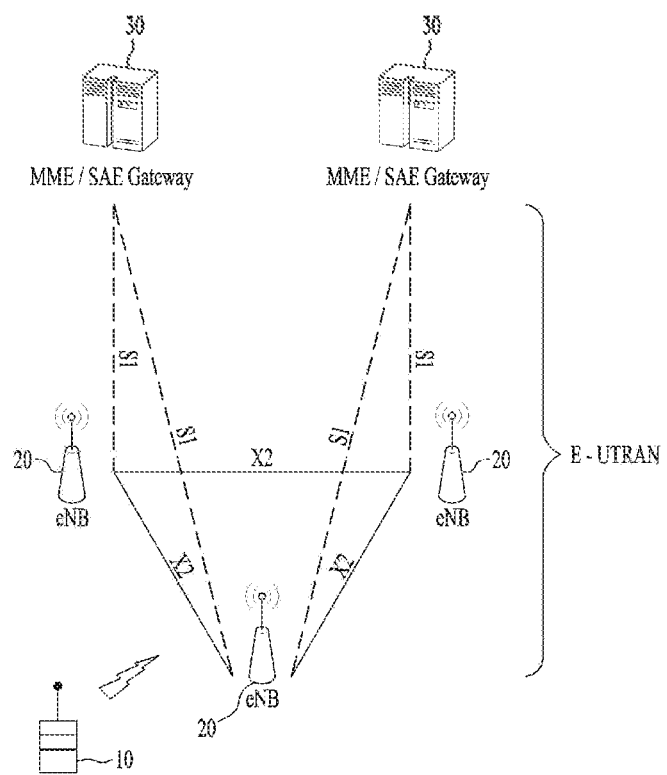
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
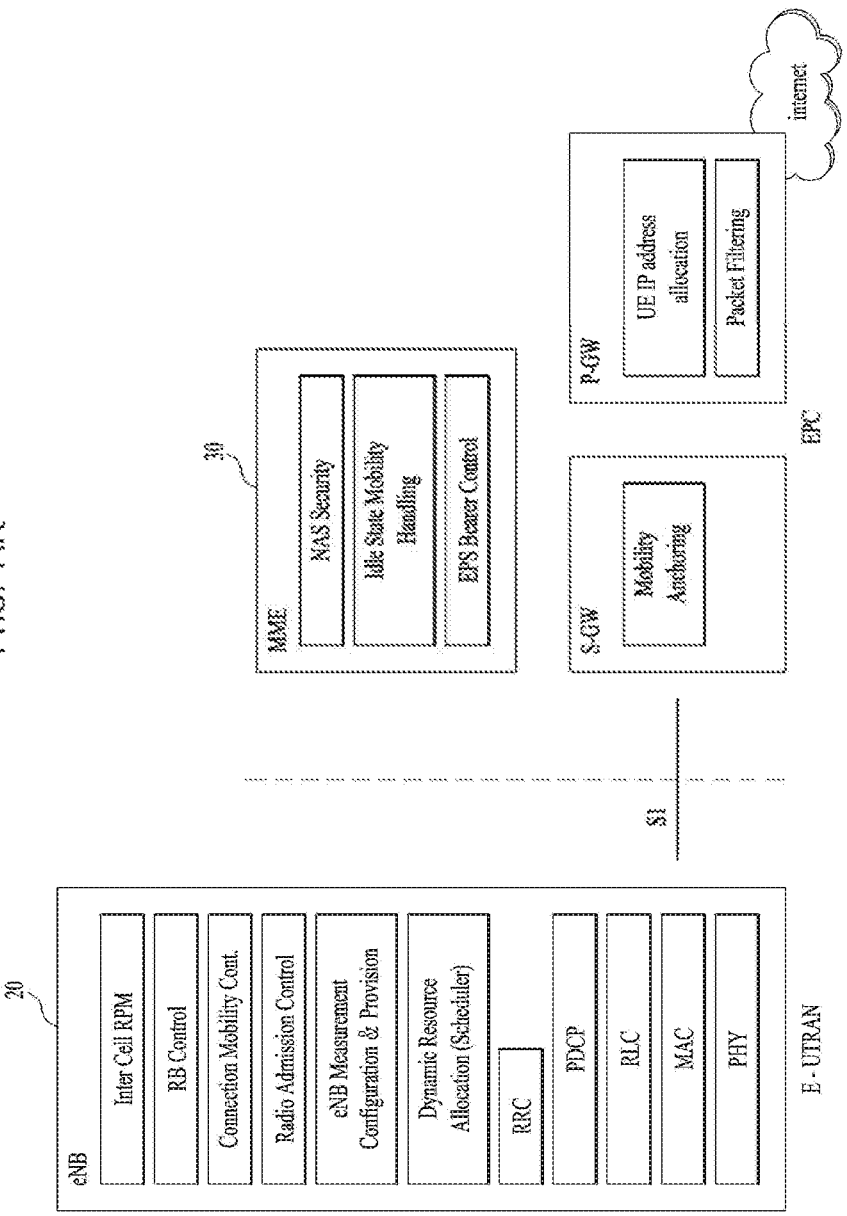
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
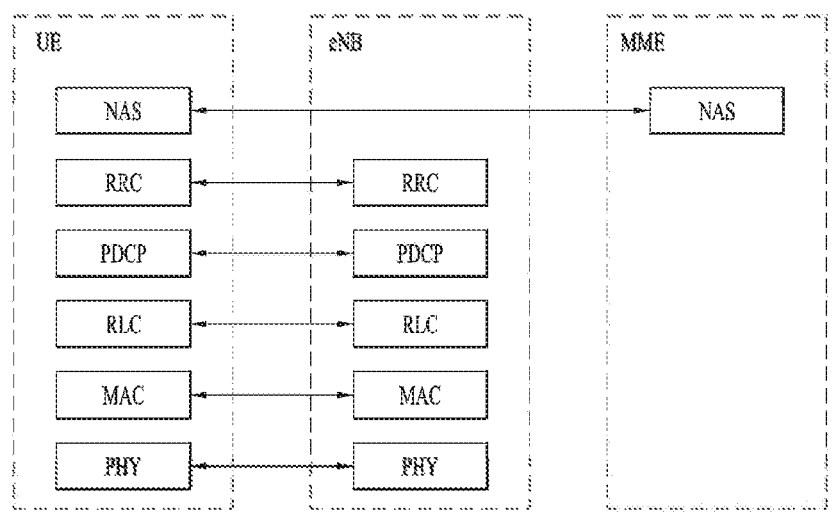
FIG. 3 is a diagram showing a control plane and a user plane of a radio interface protocol between a UE and an E-UTRAN based on a 3rd generation partnership project (3GPP) radio access network standard.
Figure 3:
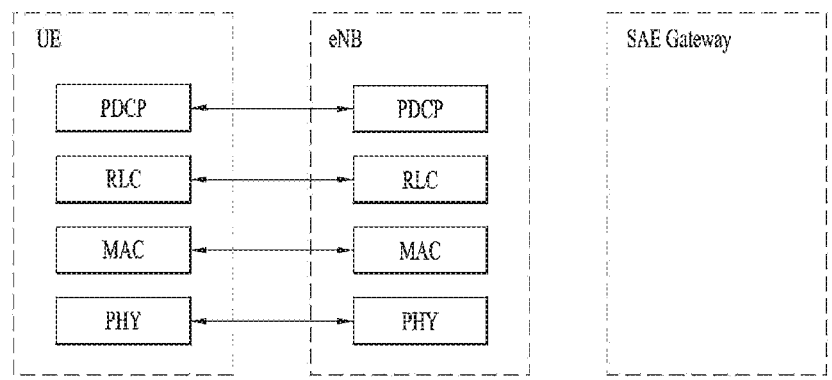

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
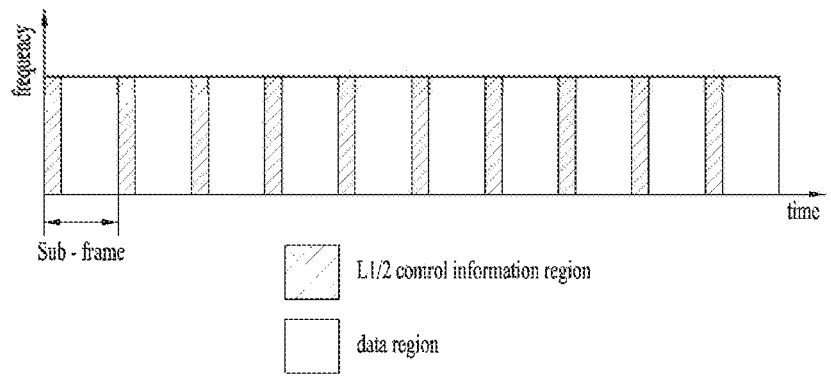
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
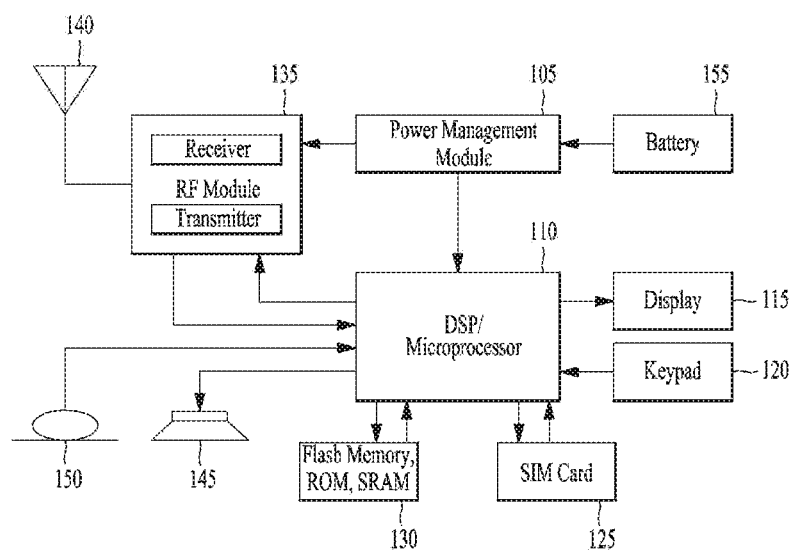
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data.

Meanwhile, the physical layer may provide the following services to the MAC: i) data transfer services; ii) signaling of HARQ feedback; iii) signaling of Scheduling Request (SR); and iv) measurements (e.g. Channel Quality Indication (CQI)). Among the services, the Scheduling Request (SR) will be introduced more specifically below.

FIG. 7 is a diagram for transmitting a Scheduling Request.

The scheduler needs knowledge about the amount of data awaiting transmission from terminals (e.g., UEs) to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request (SR).

A SR is a simple flag, raised by the terminal to request uplink resources from the uplink scheduler. Since the terminal requesting resources has no PUSCH resource, the SR is transmitted on the PUCCH. Each terminal can be assigned a dedicated PUCCH scheduling request resource, occurring every n-th subframe, as shown in FIG. 7.

When data with higher priority than already existing in the transmit buffers arrives at the terminal and the terminal has no grant and hence cannot transmit the data, the terminal transmits a SR at the next possible instant, as shown in FIG. 7. Upon reception of the request, the scheduler can assign a grant to the terminal. If the terminal does not receive a scheduling grant until the next possible scheduling-request instant, then the SR is repeated.

The use of a single bit for the SR is motivated by the desire to keep the uplink overhead small, as a multi-bit SR would come at a higher cost. A consequence of the single bit SR is the limited knowledge at the eNB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed with reference to FIG. 8.

Although the scheduling-request design for LTE relies on dedicated resources, a terminal that has not been allocated such resources obviously cannot transmit a SR. Instead, terminals without scheduling-request resources configured rely on the random-access mechanism.

When a SR is triggered, it shall be considered as pending until it is cancelled. All pending SR(s) shall be cancelled and sr-ProhibitTimer shall be stopped, when a MAC PDU is assembled and this PDU includes a BSR which contains buffer status up to (and including) the last event that triggered a BSR, or, if all pending SR(s) are triggered by Sidelink BSR, when a MAC PDU is assembled and this PDU includes a Sidelink BSR which contains buffer status up to (and including) the last event that triggered a Sidelink BSR, or, if all pending SR(s) are triggered by Sidelink BSR, when upper layers configure autonomous resource selection, or when the UL grant(s) can accommodate all pending data available for transmission.

If an SR is triggered and there is no other SR pending, the MAC entity shall set the SR_COUNTER to 0.

As long as one SR is pending, for each TTI, the MAC entity shall initiate a Random Access procedure on the SpCell and cancel all pending SRs if no UL-SCH resources are available for a transmission in this TTI, or if the MAC entity has no valid PUCCH resource for SR configured in any TTI.

Else if the MAC entity has a valid PUCCH resource for SR configured for this TTI and if this TTI is not part of a measurement gap and if sr-ProhibitTimer is not running, the MAC entity may increment SR_COUNTER by 1, may instruct the physical layer to signal the SR on PUCCH, and may start the sr-ProhibitTimer, if SR_COUNTER<dsr-TransMax. Else, the MAC entity may notify RRC to release PUCCH/SRS for all serving cells, may clear any configured downlink assignments and uplink grants, and may initiate a Random Access procedure on the SpCell and cancel all pending SRs.

It is noted that SR_COUNTER is incremented for each SR bundle. The sr-ProhibitTimer is started for each of the SR bundle. More detailed description of the SR bundle will be introduced below.

The sr-ProhibitTimer is a timer for SR transmission on PUCCH. Value in number of SR period(s) of shortest SR period of any serving cell with PUCCH. Value 0 means no timer for SR transmission on PUCCH is configured. Value 1 corresponds to one SR period, value 2 corresponds to 2*SR periods and so on. The SR period may be defined as Table 1 below.

TABLE 1

| SR configuration Index $I_{SR}$ | SR periodicity (ms) $SR_{PERIODICITY}$ | SR subframe offset $N_{OFFSET, SR}$ |
| --- | --- | --- |
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

Table 1 shows UE-specific SR periodicity and subframe offset configuration.

Meanwhile, terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The MAC control element will be shown in FIG. 8.

FIG. 8 is a diagram for signaling of buffer status.

The LCID field in one of the MAC subheaders is set to a reserved value indicating the presence of a buffer status report, as illustrated in FIG. 8.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of data available for transmission in the UL buffers of the UE. RRC may control BSR reporting by configuring the three timers periodicBSR-Timer and retxBSR-Timer and logicalChannelSR-ProhibitTimer and by, for each logical channel, optionally signaling Logical Channel Group (LCG) which allocates the logical channel to an LCG.

A BSR shall be triggered if any of the following events occur:

i) Arrival of data with higher priority than currently in the transmission buffer—that is, data in a logical-channel group with higher priority than the one currently being transmitted—as this may impact the scheduling decision. The UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR".

ii) Change of serving cell, in which case a buffer-status report is useful to provide the new serving cell with information about the situation in the terminal.

iii) Periodically as controlled by a timer. A retxBSR-Timer expires and the UE has data available for transmission for any of the logical channels which belong to a LCG, in which case the BSR is referred below to as "Regular BSR", or a periodicBSR-Timer expires, in which case the BSR is referred below to as "Periodic BSR".

iv) Instead of padding. UL resources are allocated and number of padding bits is equal to or larger than the size of the Buffer Status Report MAC control element plus its subheader, in which case the BSR is referred below to as "Padding BSR". If the amount of padding required to match the scheduled transport block size is larger than a buffer-status report, a buffer-status report is inserted. Clearly it is better to exploit the available payload for useful scheduling information instead of padding if possible.

For Regular BSR, if the BSR is triggered due to data becoming available for transmission for a logical channel for which logicalChannelSR-ProhibitTimer is configured by upper layers, the MAC entity starts the logicalChannelSR-ProhibitTimer if not running. If running, the MAC entity stops the logicalChannelSR-ProhibitTimer.

If the Buffer Status reporting procedure determines that at least one BSR has been triggered and not cancelled, the UE may instruct the Multiplexing and Assembly procedure to generate the BSR MAC control element(s), start or restart periodicBSR-Timer except when all the generated BSRs are Truncated BSRs, and start or restart retxBSR-Timer if the UE has UL resources allocated for new transmission for this TTI. Else if a Regular BSR has been triggered and logicalChannelSR-ProhibitTimer is not running, a Scheduling Request shall be triggered if an uplink grant is not configured or the Regular BSR was not triggered due to data becoming available for transmission for a logical channel for which logical channel SR masking (logicalChannelSR-Mask) is setup by upper layers.

As discussed above, in order to request an UL grant having a proper amount of UL resources, a UE can transmit a BSR and/or a SR to at least one eNB. When the UE receives the UL grant, the UE can transmit UL data using the UL grant.

Recently, for low-end (e.g. low average revenue per user, low data rate, delay tolerant) applications such as some Machine-Type Communications (MTCs), a concept of a low complexity UE is introduced.

A low complexity UE indicates UE Category 0 and has reduced Tx and Rx capabilities compared to other UE of different categories. A low complexity UE may access a cell only if SIB1 indicates that access of low complexity UEs is supported. If the cell does not support low complexity UEs, a low complexity UE considers the cell as barred.

The eNB determines that a UE is a low complexity device based on the LCID for CCCH and the UE capability. The S1 signaling has been extended to include the UE Radio Capability for Paging. This paging specific capability information is provided by the eNB to the MME, and the MME uses this information to indicate to the eNB that the paging request from the MME concerns a low complexity UE.

Supporting UEs in Enhanced Coverage is described below.

A UE in enhanced coverage is a UE that requires the use of coverage enhancement techniques to access the cell. The UE may access a cell using enhanced coverage techniques only if MIB indicates that access of UEs in enhanced coverage is supported. The UE in enhanced coverage receives a separate occurrence of system information blocks (sent using different time/frequency resources). The separate occurrence of SIB1 for UEs in enhanced coverage is identical to the separate occurrence of SIB1 for bandwidth reduced low complexity UEs. The UE in enhanced coverage has a transport block (TB) size limited to 1000 bit for broadcast and unicast. The SIB transmission occasions within an SI-window are provided in the SIB1 specific for UEs in enhanced coverage. The BCCH modification period used for UEs in enhanced coverage is a multiple of the BCCH modification period provided in SIB2. A UE in enhanced coverage can acquire SI messages across SI windows. A UE capable of enhanced coverage acquires, if needed, and uses legacy system information when operating in normal coverage if it is not a bandwidth reduced low complexity UE. The UE capable of enhanced coverage acquires, if needed, and uses system information specific for UEs operating in enhanced coverage. The UE in enhanced coverage is not required to detect SIB change when in RRC_CONNECTED. A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs operating in the same enhanced coverage level use random access resources associated with the same coverage enhancement level. Time/frequency resources and repetition factor for random access response messages for UEs in enhanced coverage are derived from the used PRACH resources. The UE in enhanced coverage is paged using the same mechanism for paging bandwidth reduced low complexity UEs. The starting subframe of a paging occasion and the repetition pattern (in both time and frequency domain for downlink common control signaling) of that paging occasion are determined irrespective of the UEs enhanced coverage level. Information from MME to eNB on whether the paging request is for a UE that supports enhanced coverage functionality is provided in S1 paging request signaling. Coverage enhancement level related information and corresponding cell ID are provided from the eNB to the MME to that end. A UE in RRC_IDLE does not inform the network when it changes the enhanced coverage level within a cell or when it changes to another cell. The UE shall re-select to inter-frequency cells in which it is able to operate in normal coverage over cells in which it has to be in enhanced coverage.

As discussed above, in case of MTC, power saving or latency reduction is one of important issues in this technology. Thus, in case of a UE in enhanced coverage, a Scheduling Request (SR) would be transmitted repeatedly to the network (e.g., base station). In other words, SR transmission is repeated for a configured number of times. In this case, MAC layer (of a UE) may indicate PHY layer (of the UE) to perform SR transmission and the PHY layer is responsible for repetition transmission of SR. Hereinafter, the SR which is transmitted repeatedly may be referred as a SR bundle.

Meanwhile, in SR procedure, sr-ProhibitTimer is used in order to avoid too frequent triggering of SR while waiting for UL grant. Considering the SR bundle, there are some discussions for new UE behavior on the SR-prohibit timer. Detailed will be discussed with reference to FIG. 9.

FIG. 9 shows two exemplary cases according to the starting points of SR-prohibit timer in case of SR bundle transmission.

There are some proposals to specify exact starting point of the SR-prohibit timer upon transmitting the SR bundle. One is to start the timer at the end of the SR bundle transmission (as shown in Case 1 of FIG. 9), and another is to start the timer at the start of SR bundle transmission (as shown in Case 2 of FIG. 9).

According to the Case 2, it may happen that the sr-ProhibitTimer expires while PHY layer is performing repetition transmission of the SR (i.e., the SR bundle transmission). It implies that another SR may be triggered while there is on-going SR transmission in PHY layer. To cope with this, there was an opinion proposing that the sr-ProhibitTimer starts after the last repetition transmission of SR, as shown in Case 1 of FIG. 9. However, this also doesn't resolve a problem, that is—another SR can be triggered before the sr-ProhibitTimer starts while PHY layer is performing repetition transmission of the SR. Triggering another SR while there is on-going SR repetition transmission in PHY layer, the UE may keep transmitting SR unnecessarily in PHY layer even when SR cancellation condition is met in MAC layer. It consumes the UE power and may incur waste uplink resource by requesting uplink resource to the eNB even in case there is no data to transmit. Therefore, a mechanism that enables stopping SR transmission in PHY layer is needed.

Thus, the present invention proposes that when SR cancellation condition is met, a UE stops transmission of a SR bundle immediately even if at least part of repeated transmissions of a SR included in the SR bundle has not yet been transmitted. More specific descriptions will be introduced with reference to FIG. 10 and FIG. 11.

FIG. 10 is a conceptual diagram for performing transmission of a SR bundle in a wireless communication system according to embodiments of the present invention.

Hereinafter, it is assumed that a UE is configured to transmit a SR bundle, which includes repeated transmissions of a SR, when the SR is triggered.

When SR cancellation condition is met in a MAC layer of the UE, the MAC layer indicates to a PHY layer of the UE that the SR cancellation condition is met. Upon being indicated that the SR cancellation condition is met by the MAC layer, the PHY layer stops transmitting the remaining number of repetition transmission of the SR.

That is, the UE is performing repetition transmission of SR for a specific number of transmission times. For this, the MAC layer instructs the PHY layer to transmit SR. Upon being instructed by the MAC layer, the PHY layer starts to transmit SR for the specific number of transmission times.

When the MAC layer checks whether SR cancellation condition is met, where SR cancellation condition includes the followings: when a MAC PDU is assembled and this PDU includes a BSR which contains buffer status up to (and including) the last event that triggered a BSR; or, if all pending SR(s) are triggered by Sidelink BSR, when a MAC PDU is assembled and this PDU includes a Sidelink BSR which contains buffer status up to (and including) the last event that triggered a Sidelink BSR; or, if all pending SR(s) are triggered by Sidelink BSR, when upper layers configure autonomous resource selection; or when the UL grant(s) can accommodate all pending data available for transmission.

When the MAC layer considers that SR cancellation condition is met, the MAC layer indicates to the PHY layer that: SR cancellation condition is met; or SR transmission needs to be stopped.

When SR cancellation condition is met, all pending SR(s) shall be cancelled and the sr-ProhibitTimer shall be stopped.

When the PHY layer is indicated by the MAC layer that SR cancellation condition is met or SR transmission needs to be stopped: The PHY layer stops the transmission of SR immediately. That is, the PHY layer stops transmitting the remaining number of repetition transmission of the SR even if PHY layer hasn't been transmitted the specific number of repetition transmission of the SR yet.

Referring to FIG. 10, a UE configures that the UE transmits a SR bundle (S1001). The SR bundle may include repeated transmissions of a SR. In some embodiments, the UE may be a low complexity UE (e.g., a UE in Enhanced Coverage).

When the SR is triggered, the UE starts to transmit the SR bundle to a BS (S1003).

Meanwhile, when SR cancellation condition is met while the SR bundle is transmitted, the UE stops the transmission of the SR bundle immediately even if at least part of the repeated transmissions of the SR has not yet been transmitted (S1005).

In some embodiments, the SR cancellation condition is met when a MAC PDU including a BSR which contains buffer status up to a last triggering event of the BSR is assembled, or when an UL grant for the UE can accommodate all pending data available for transmission.

Preferably, a MAC layer of the UE indicates to a PHY layer that the SR cancellation condition is met when the SR cancellation condition is met. Or, a MAC layer of the UE indicates to a PHY layer that the transmission of the SR bundle needs to be stopped when the SR cancellation condition is met. When the PHY layer is indicated that the transmission of the SR bundle needs to be stopped, the PHY layer stops the transmission of the SR bundle immediately.

An example of starting and stopping transmission of a SR bundle will be described with reference to FIG. 11.

FIG. 11 shows an example of transmission of a SR bundle according to embodiments of the present invention.

Each of blocks in FIG. 11 (i.e., empty blocks, blocks filled with dot pattern, and blocks filled with diagonal pattern) may be considered as a SR possibility shown in FIG. 7 above.

Referring to FIG. 11, when a SR is triggered, transmission of a SR bundle is started. As shown in FIG. 11, it is assumed that the number of repeated transmissions of a SR included in the SR bundle is 5. It may also infer that a UE, which transmits the SR bundle, is operating in enhanced coverage (EC) mode with a Coverage Enhancement (CE) level 5, but not limited thereto.

While there is on-going transmission of the SR bundle, SR cancellation condition can be met. In the present exemplary embodiments, the SR cancellation condition is met after 3 times of repeated transmissions of the SR (i.e., 3 blocks filled with dot pattern in FIG. 11). In this case, the UE does not transmit remaining 2 times of repeated transmissions of the SR included in the SR bundle (i.e., 2 blocks filled with diagonal pattern in FIG. 11).

In summary, according to the present invention, when SR cancellation condition is met while a SR bundle is being transmitted, a UE stops transmission of the SR bundle immediately even if at least part of repeated transmissions of a SR included in the SR bundle has not yet been transmitted. Accordingly, it is possible to avoid performing unnecessary SR transmission.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   receiving, at a physical (PHY) layer of the UE, a signal for informing a transmission of a scheduling request (SR) from a medium access control (MAC) layer of the UE;
   based on the signal being received, starting, at the PHY layer of the UE, an SR bundle transmission, wherein the SR bundle transmission includes repetitive transmissions of the SR; and
   based on receiving an SR cancellation information at the PHY layer from the MAC layer while the SR bundle transmission is on-going, stopping, at the PHY layer of the UE, a remaining repetitive SR transmissions of the SR bundle transmission that has not yet been transmitted,
   wherein the SR cancellation information is transmitted from the MAC layer based on an autonomous resource selection configured by upper layers while all pending SRs are triggered by a sidelink buffer status report (BSR).

2. A User Equipment (UE) for operating in a wireless communication system, the UE comprising:
   a transceiver; and
   a processor that:
   receives, at a physical (PHY) layer of the UE, a signal for informing a transmission of a scheduling request (SR) from a medium access control (MAC) layer of the UE;
   based on the signal being received, starts, at the PHY layer of the UE, an SR bundle transmission, wherein the SR bundle transmission includes repetitive transmissions of the SR; and
   based on receiving an SR cancellation information at the PHY layer from the MAC layer while the SR bundle transmission is on-going, stops, at the PHY layer of the UE, a remaining repetitive SR transmissions of the SR bundle transmission that has not yet been transmitted,
   wherein the SR cancellation information is transmitted from the MAC layer based on an autonomous resource selection configured by upper layers while all pending SRs are triggered by a sidelink buffer status report (BSR).

* * * * *